(12) United States Patent
Konecny et al.

(10) Patent No.: US 8,213,192 B2
(45) Date of Patent: Jul. 3, 2012

(54) PRIMARY SIDE SENSING FOR ISOLATED FLY-BACK CONVERTERS

(75) Inventors: Pavel Konecny, San Jose, CA (US); Yeshoda Yedevelly, Sunnyvale, CA (US)

(73) Assignee: Silicon Laboratories Inc., Austin, TX (US)

( * ) Notice: Subject to any disclaimer, the term of this patent is extended or adjusted under 35 U.S.C. 154(b) by 346 days.

(21) Appl. No.: 12/649,533

(22) Filed: Dec. 30, 2009

(65) Prior Publication Data
US 2011/0157922 A1   Jun. 30, 2011

(51) Int. Cl.
*H02M 3/335*   (2006.01)
(52) U.S. Cl. .................................. 363/21.13; 363/21.16
(58) Field of Classification Search ............... 363/21.13, 363/21.16, 131
See application file for complete search history.

(56) References Cited

U.S. PATENT DOCUMENTS

| | | |
|---|---|---|
| 5,138,543 A | 8/1992 | Harm et al. |
| 5,438,499 A | 8/1995 | Bonte et al. |
| 5,841,643 A | 11/1998 | Schenkel |
| 5,874,841 A | 2/1999 | Majid et al. |
| 5,956,242 A | 9/1999 | Majid et al. |
| 5,973,945 A | 10/1999 | Balakrishnan et al. |
| 6,333,624 B1 | 12/2001 | Ball et al. |
| 6,385,059 B1 | 5/2002 | Telefus et al. |
| 6,590,789 B2 | 7/2003 | Bailly |
| 6,862,198 B2 | 3/2005 | Muegge et al. |
| 6,882,552 B2 | 4/2005 | Telefus et al. |
| 6,894,911 B2 | 5/2005 | Telefus et al. |
| 6,900,995 B2 | 5/2005 | Muegge et al. |
| 6,958,920 B2 | 10/2005 | Mednik et al. |
| 6,972,969 B1 | 12/2005 | Shteynberg et al. |
| 6,995,986 B2 | 2/2006 | Balakrishnan et al. |
| 7,102,899 B2 | 9/2006 | Reinhard et al. |
| 7,142,437 B2 | 11/2006 | Park |
| 7,215,105 B2 | 5/2007 | Balakrishnan et al. |
| 7,332,900 B2 | 2/2008 | Currell |
| 7,359,222 B2 | 4/2008 | Mayell et al. |
| 7,359,225 B2 | 4/2008 | Djenguerian et al. |
| 7,791,907 B2 * | 9/2010 | Cho et al. ................... 363/21.01 |
| 2005/0276083 A1 | 12/2005 | Berghegger |

* cited by examiner

*Primary Examiner* — Shawn Riley
(74) *Attorney, Agent, or Firm* — Zagorin O'Brien Graham LLP

(57) ABSTRACT

A switching voltage regulator samples signals corresponding to a flyback voltage on an auxiliary winding on a primary side of the switching voltage regulator. The flyback voltage functions as feedback from the output voltage on the secondary side. On detection of presence of the flyback voltage, samples corresponding to the flyback voltage are stored until the flyback voltage falls below a threshold voltage. A history of N samples of the flyback voltage is thus maintained. A sample older than the most recently stored sample is used to generate control for generation of the output voltage of the switching voltage regulator. Use of the older sample ensures that the flyback voltage sample used is one that is close to, but before the current in the secondary winding goes to zero.

20 Claims, 9 Drawing Sheets

FIG. 6B

| IN[2] | IN[1] | IN[0] | SW[7] | SW[6] | SW[5] | SW[4] | SW[3] | SW[2] | SW[1] | SW[0] |
|---|---|---|---|---|---|---|---|---|---|---|
| 0 | 0 | 0 | 0 | 0 | 0 | 0 | 0 | 0 | 0 | 1 |
| 0 | 0 | 1 | 0 | 0 | 0 | 0 | 0 | 0 | 1 | 0 |
| 0 | 1 | 0 | 0 | 0 | 0 | 0 | 0 | 1 | 0 | 0 |
| 0 | 1 | 1 | 0 | 0 | 0 | 0 | 1 | 0 | 0 | 0 |
| 1 | 0 | 0 | 0 | 0 | 0 | 1 | 0 | 0 | 0 | 0 |
| 1 | 0 | 1 | 0 | 0 | 1 | 0 | 0 | 0 | 0 | 0 |
| 1 | 1 | 0 | 0 | 1 | 0 | 0 | 0 | 0 | 0 | 0 |
| 1 | 1 | 1 | 1 | 0 | 0 | 0 | 0 | 0 | 0 | 0 |

FIG. 6C

| SEL[0] | SEL[1] | SEL[2] | SEL[3] | SEL[4] | SEL[5] | SEL[6] | SEL[7] | SW[0] | SW[1] | SW[2] | SW[3] | SW[4] | SW[5] | SW[6] | SW[7] |
|---|---|---|---|---|---|---|---|---|---|---|---|---|---|---|---|
| 0 | 0 | 1 | 0 | 0 | 0 | 0 | 0 | 1 | 0 | 0 | 0 | 0 | 0 | 0 | 0 |
| 0 | 0 | 0 | 1 | 0 | 0 | 0 | 0 | 0 | 1 | 0 | 0 | 0 | 0 | 0 | 0 |
| 0 | 0 | 0 | 0 | 1 | 0 | 0 | 0 | 0 | 0 | 1 | 0 | 0 | 0 | 0 | 0 |
| 0 | 0 | 0 | 0 | 0 | 1 | 0 | 0 | 0 | 0 | 0 | 1 | 0 | 0 | 0 | 0 |
| 0 | 0 | 0 | 0 | 0 | 0 | 1 | 0 | 0 | 0 | 0 | 0 | 1 | 0 | 0 | 0 |
| 0 | 0 | 0 | 0 | 0 | 0 | 0 | 1 | 0 | 0 | 0 | 0 | 0 | 1 | 0 | 0 |
| 1 | 0 | 0 | 0 | 0 | 0 | 0 | 0 | 0 | 0 | 0 | 0 | 0 | 0 | 1 | 0 |
| 0 | 1 | 0 | 0 | 0 | 0 | 0 | 0 | 0 | 0 | 0 | 0 | 0 | 0 | 0 | 1 | ian
PRIMARY SIDE SENSING FOR ISOLATED FLY-BACK CONVERTERS

BACKGROUND

1. Field of the Invention

The present invention is directed to isolated switching voltage converters and more particularly to primary side sensing of the output voltage on the secondary side of a switching voltage converter.

2. Description of the Related Art

Switching voltage converters (also referred to herein as switching voltage regulators) are used to provide, e.g., regulated DC output voltage from an unregulated AC input. Typical consumer products involving such switching regulators include cell phone chargers, laptop or printer power supplies (so-called "bricks"), and embedded PC power supplies.

FIG. 1 illustrates a switching regulator 100 having a flyback topology commonly used in power supplies with output power less than 200 W. The illustrated topology is suitable for discontinuous current mode (DCM) operation in which the transformer core is fully demagnetized in each cycle. Another mode of operation is continuous current mode (CCM).

The switching regulator 100 includes high voltage isolation between the DC output (secondary side) and the AC mains input (primary side). The isolation is required for safety/regulatory reasons and may also be required for functional reasons. The power is transferred from the primary side to the secondary side using a transformer 102 meeting isolation requirements and primary side high voltage switch 104.

The switching regulator shown in FIG. 1 operates as follows for DCM operation. When the power MOSFET switch 104 turns ON (TON phase) according to the gate control signal supplied by the controller integrated circuit 106, the current through primary winding 105 ramps up with a slope of Vin/Lp and the energy stored in the transformer core at the end of the TON cycle is proportional to $0.5 \times Lp \times Ippeak^2$, where Lp is the transformer primary winding inductance and Ippeak is the primary winding peak current. The output current Is is zero during the TON phase and the voltage Vs is negative referenced to the secondary side ground, Vs=−Ns*Vin, where Ns is the transformer secondary/primary turn ratio.

When switch 104 turns OFF (TOFF phase), the primary inductor current Ip becomes zero and secondary current Is ramps down from the value Ispeak=Ippeak/Ns to zero, with a slope of approximately ~(Vout+Vdout)/Ls. When Is>0 and Q1 is OFF, the output voltage is reflected according to the transformer turn ratio back to the primary side and is usually called primary flyback voltage: Vfly_p~(Vout+Vdout)/Ns, where Vout is the output voltage, Vdout is a voltage drop across the output diode 107 and Ns is defined as above. Once the secondary winding current Is reaches zero, both transformer windings become open (provided that loading on auxiliary winding can be neglected) and flyback voltage converts to damped ringing waveform fueled by residual energy in the Lp and Cd resonant circuit, where Cd is the total equivalent capacitance at the drain of Q1.

Accurate regulation of the output voltage requires feedback proportional to output voltage. The feedback controls the duty cycle of switch 104 in order to keep the output voltage constant over changing load and input voltage. The feedback path needs to cross the isolation barrier between the primary and secondary. A common feedback solution uses an opto-coupler 108 as shown in FIG. 1.

The use of an opto-coupler for feedback has costs such as additional components as well as PCB area space. An opto-coupler feedback approach typically requires additional passive and active components like resistors, capacitors and a shunt regulator. The shunt regulator 109 can be alternatively replaced by Zener diode when lower quality output voltage regulation accuracy can be tolerated.

There have been suggestions to replace the opto-coupler and regulate the output voltage by sensing the flyback voltage at either the primary winding or at an auxiliary winding (sometimes referred to as a bias winding). Such approaches are usually denoted as regulation using magnetic flux sensing or primary side sensing. However prior art primary side sensing approaches have had problems with accurately determining the flyback voltage. Accordingly, improved primary side sensing is desirable.

SUMMARY

In one embodiment of the invention, a method is provided for a switching voltage converter that includes sampling and storing samples corresponding to a flyback voltage on a primary side of the switching voltage converter. The samples are stored in respective storage locations and provide a history of the flyback voltage. In response to detecting the flyback voltage falling below a threshold voltage value, storing of additional samples is stopped. The method further includes selecting one of the stored flyback voltage samples, older than a most recent sample, as indicative of an output voltage on a secondary side of the switching voltage converter.

In another embodiment, an apparatus is provided. The apparatus includes a flyback voltage detection circuit to provide a first indication of the flyback voltage being above a first predetermined voltage and to generate a second indication of the flyback voltage going below a second predetermined voltage. A storage stores respective samples corresponding to the flyback voltage. The storage is enabled to store the respective samples in respective storage locations responsive to the first indication and to stop storing additional samples corresponding to the flyback voltage responsive to the second indication.

BRIEF DESCRIPTION OF THE DRAWINGS

The present invention may be better understood, and its numerous objects, features, and advantages made apparent to those skilled in the art by referencing the accompanying drawings.

FIG. 6B illustrates an exemplary switch decoder truth table.

FIG. 6C illustrates an exemplary capacitor selection logic truth table.

DESCRIPTION OF THE PREFERRED EMBODIMENT(S)

Figure 1:
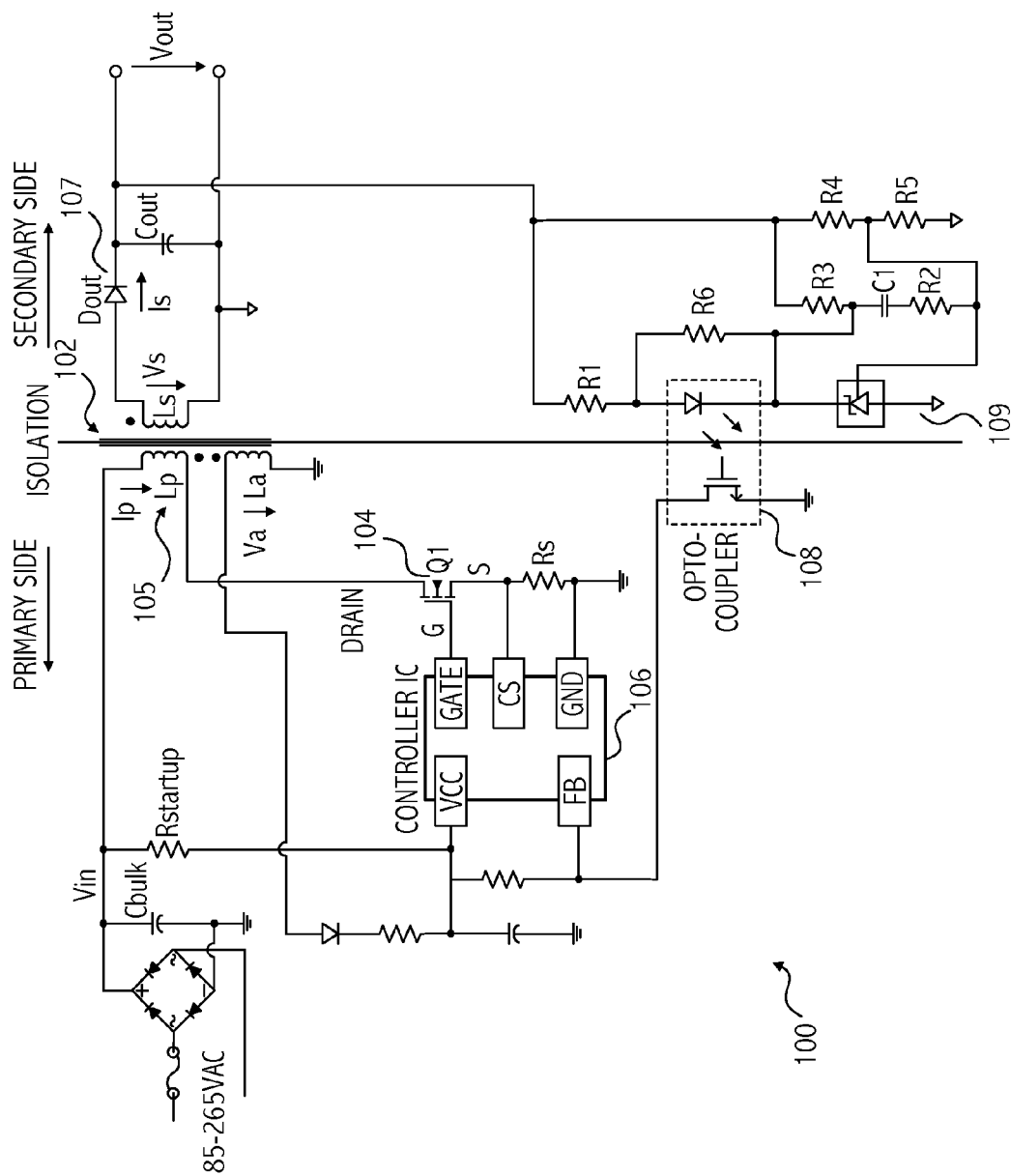
FIG. 1 illustrates a switching regulator having a flyback topology commonly used in power supplies.
Figure 2:
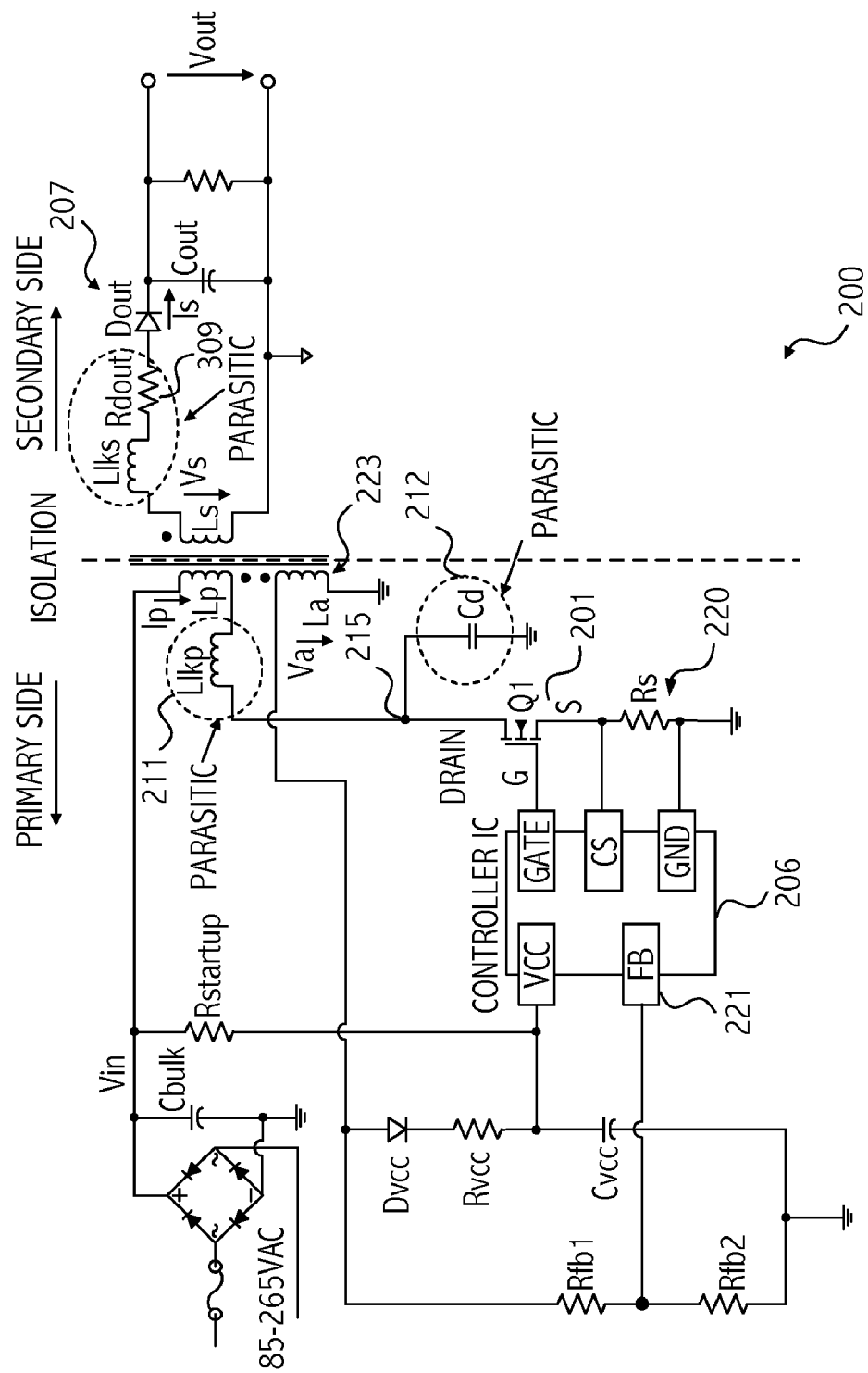
FIG. 2 illustrates a switching regulator according to an embodiment of the invention.

Referring to FIG. 2, illustrated is a high level diagram of a switching voltage regulator 200 incorporating an embodiment of the invention that senses flyback voltage in a manner that provides output voltage regulation accuracy while avoiding most errors, mainly due to external parasitic impedances. The switching voltage regulator 200 includes a controller integrated circuit 206 that provides appropriate processing for the flyback voltage according to an embodiment of the invention. The circuit providing the flyback processing can be implemented in plain digital CMOS processes, and since it has a small digital logic content, occupies a small silicon area even in an older and larger feature size CMOS process.

The power MOSFET switch 201 turns ON (TON phase) and OFF (TOFF phase) according to the gate control signal supplied by the controller integrated circuit 206. An auxiliary winding 223 is coupled to the feedback (FB) pin 221 of integrated circuit 206. That auxiliary winding provides the flyback voltage that indicates the output voltage on the secondary side of the voltage regulator 200 and is used to control the gate control signal for MOSFET switch 201.

Flyback voltage can be sensed either at the primary winding or at the auxiliary (or bias) winding. A disadvantage of sensing at the primary winding is that flyback voltage is usually very high (in practice ranging from tens of volts to hundreds) and is referred to rectified AC input voltage at bulk capacitor (can be several hundred volts—ranging from 85 VAC to 265 VAC for universal power supply), which suggests a differential sensing method using resistors with high error due to finite common mode rejection. Also, sense resistors need to have high resistance (several MOhms to reduce dissipation), which makes the flyback sensing slow due to a significant RC time constant. An approach more preferred in practice uses an auxiliary (or bias) winding to sense the flyback voltage which is referred to ground. The magnitude of the sensed flyback voltage can be controlled by transformer auxiliary/secondary winding turn ratio and/or by a resistive divider.

One of the technical difficulties when using an auxiliary winding to sense the output voltage is to find the right moment to sample the flyback voltage, which is available only in a limited time window in each cycle and has a duration that is not fixed. The determination of the right sampling moment is important in order to eliminate the errors due to various parasitic impedances and the output diode voltage drop.

Figure 3:
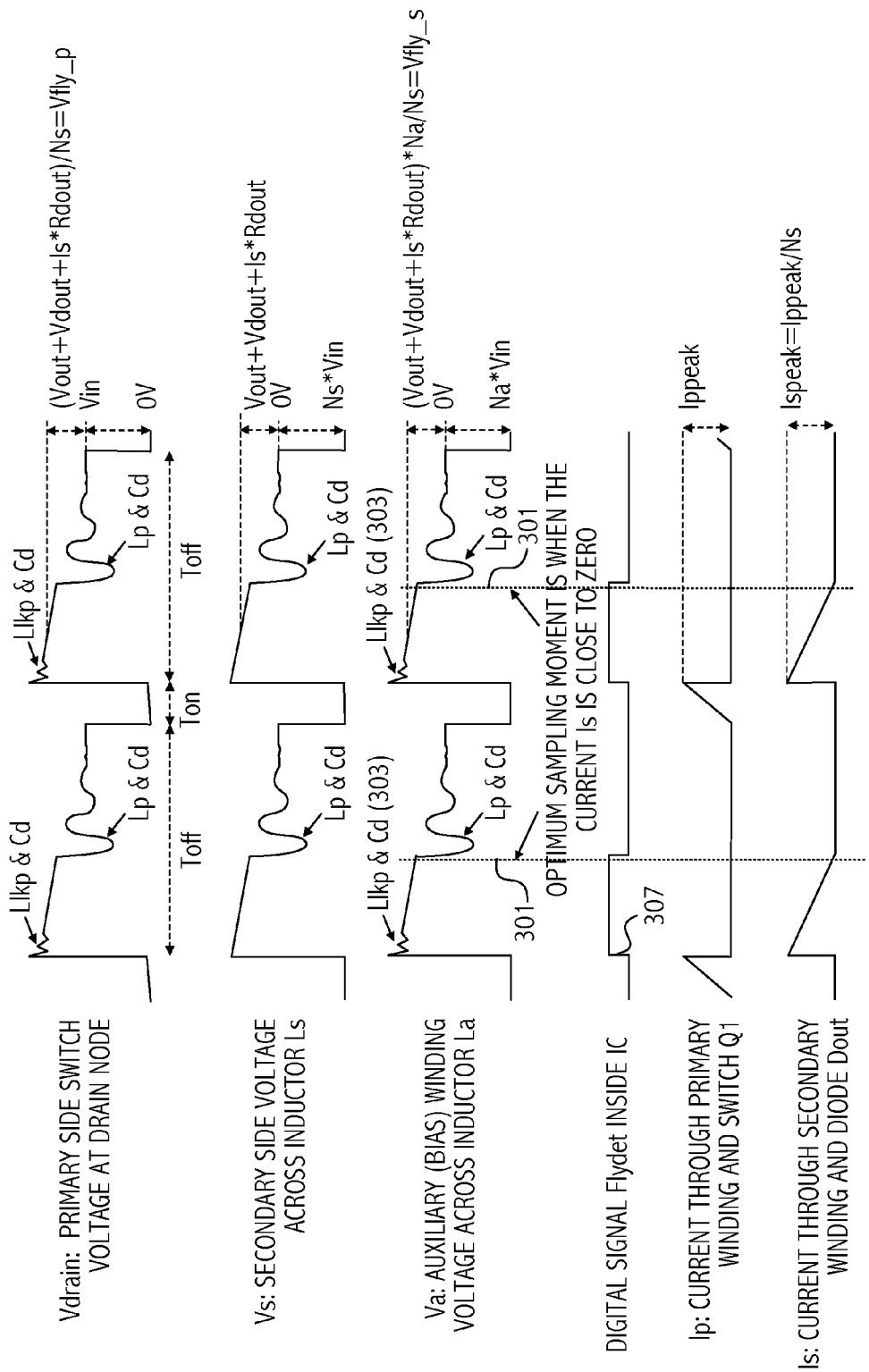
FIG. 3 illustrates current and voltage waveforms associated with the embodiment illustrated in FIG. 2.

With reference to the waveforms of FIG. 3 and the circuit diagram of FIG. 2, sources of error associated with measuring the flyback voltage include the voltage drop across output diode Dout 207, which is current dependant, and the voltage drop across output diode series resistance Rdout 209.

The relationship between output voltage and the primary winding flyback voltage is as follows:

$$Vfly\_p=(Vout+Vdout+Is*Rdout)/Ns$$

where Vout is output voltage, Vdout is the voltage drop across output diode, Ns is the transformer secondary/primary turn ratio, Is is the current through secondary winding, and Rdout is the output diode series resistance.

From the formula above it can be concluded that if the flyback waveform is sampled at the moment when the current Is is close to zero, the term Rdout*Is becomes negligible. Also, the term Vdout becomes less dependant on current Is if the flyback voltage is sampled just before the end of flyback in each switching cycle as shown at 301 in FIGS. 3 and 4.

As shown in FIG. 2, Llkp 211 is the transformer primary winding leakage inductance and Cd 212 is the total equivalent capacitance at drain node 215 of transistor 201. Llkp and Cd form a resonant circuit causing oscillations/ringing that is superimposed on top of the flyback voltage waveform as shown at 303 in FIG. 3. These oscillations/ringing are usually damped, so that sampling the flyback voltage waveform when Is is close to zero, which means at the end of the flyback window, the ringing amplitude is small enough to be neglected. The ringing can be further damped, if necessary, by using an RC snubber (RC in series) at the drain node or in parallel with the auxiliary winding.

Figure 4:
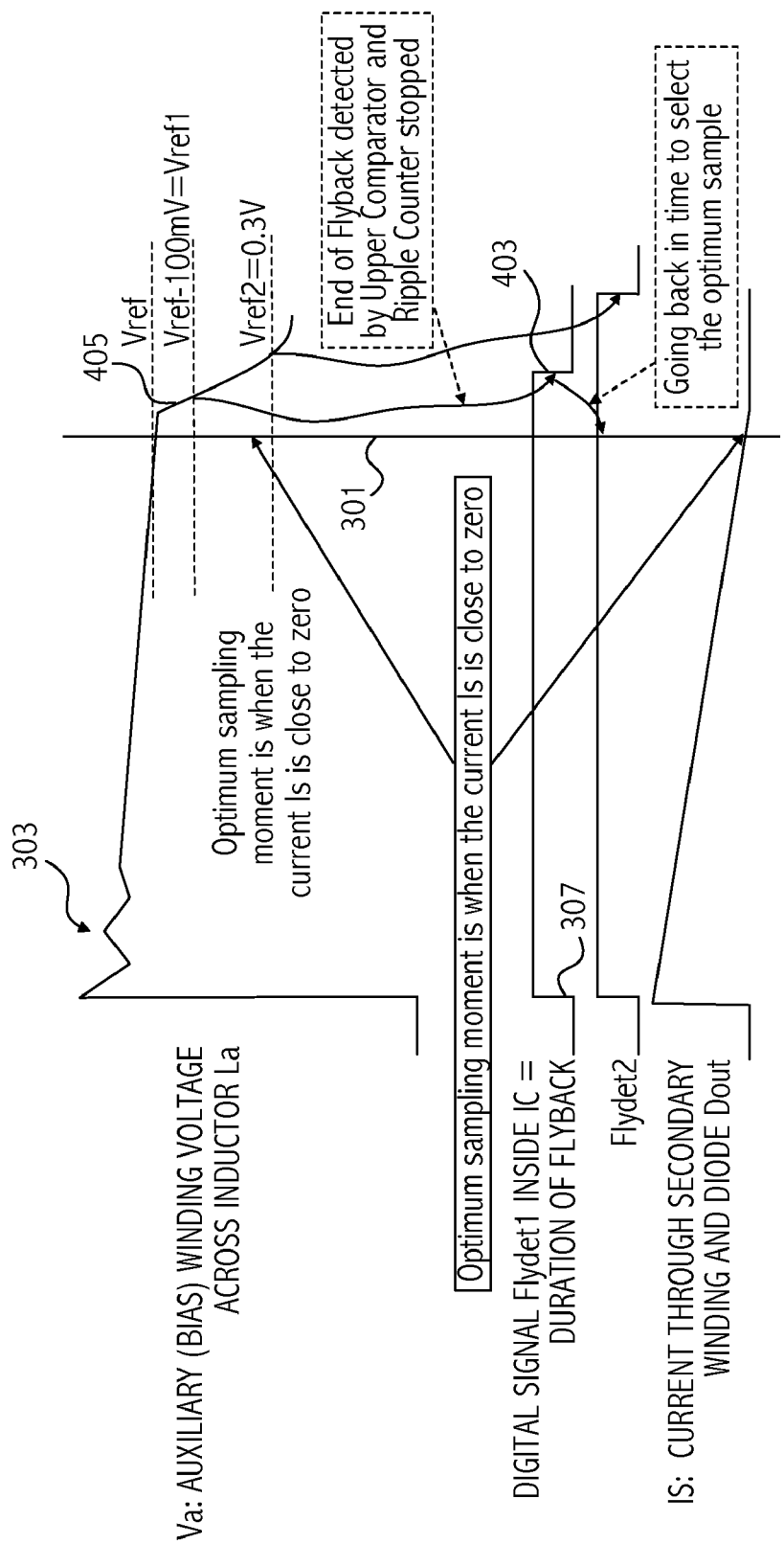
FIG. 4 illustrates a closer view of voltage and current waveforms associated with the embodiment illustrated in FIG. 3.

Another complication that needs to be overcome is that, when the secondary current Is reaches zero, the flyback voltage falls abruptly as shown at 405 in FIG. 4. Further, the duration of flyback in each cycle is difficult to determine precisely as it is a function of such factors as the secondary winding peak current, the actual inductance of secondary winding, and output voltage.

Figure 5:
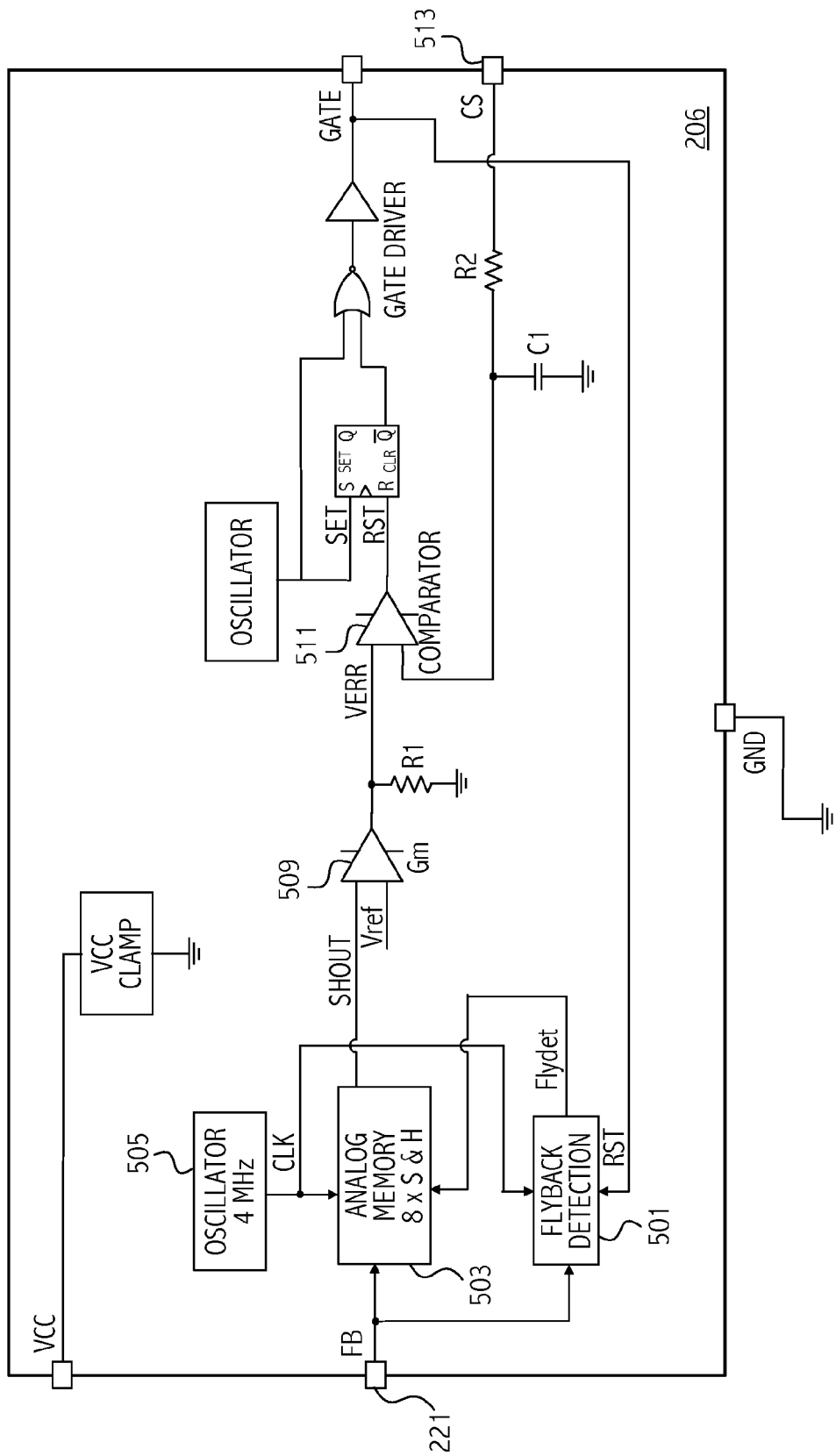
FIG. 5 illustrates relevant portions of a controller integrated circuit associated with flyback voltage sensing.

An exemplary embodiment that addresses the complications related to flyback sensing is depicted in FIGS. 5-8. FIG. 5 shows an exemplary controller integrated circuit (IC) 206 block diagram (showing relevant portions associated with flyback sensing). The IC 206 includes a flyback detection circuit 501, an analog sample and hold memory block 503, and an oscillator 505. Referring back to FIG. 2, the feedback (FB) pin 221 couples to auxiliary winding 223 through resistive divider Rfb1 and Rfb2. The flyback voltage at FB pin 321 is related to the output voltage with the formula:

$$Vfly\_fb=(Rfb2/(Rfb1+Rfb2))*((Vout+Vdout+Is*Rdout)*Na)/Ns,$$

where all variables are defined above except for Rfb1, Rfb2, which form a resistive divider coupled auxiliary winding 223. Na is the auxiliary winding to primary winding turn ratio.

Figure 6A:
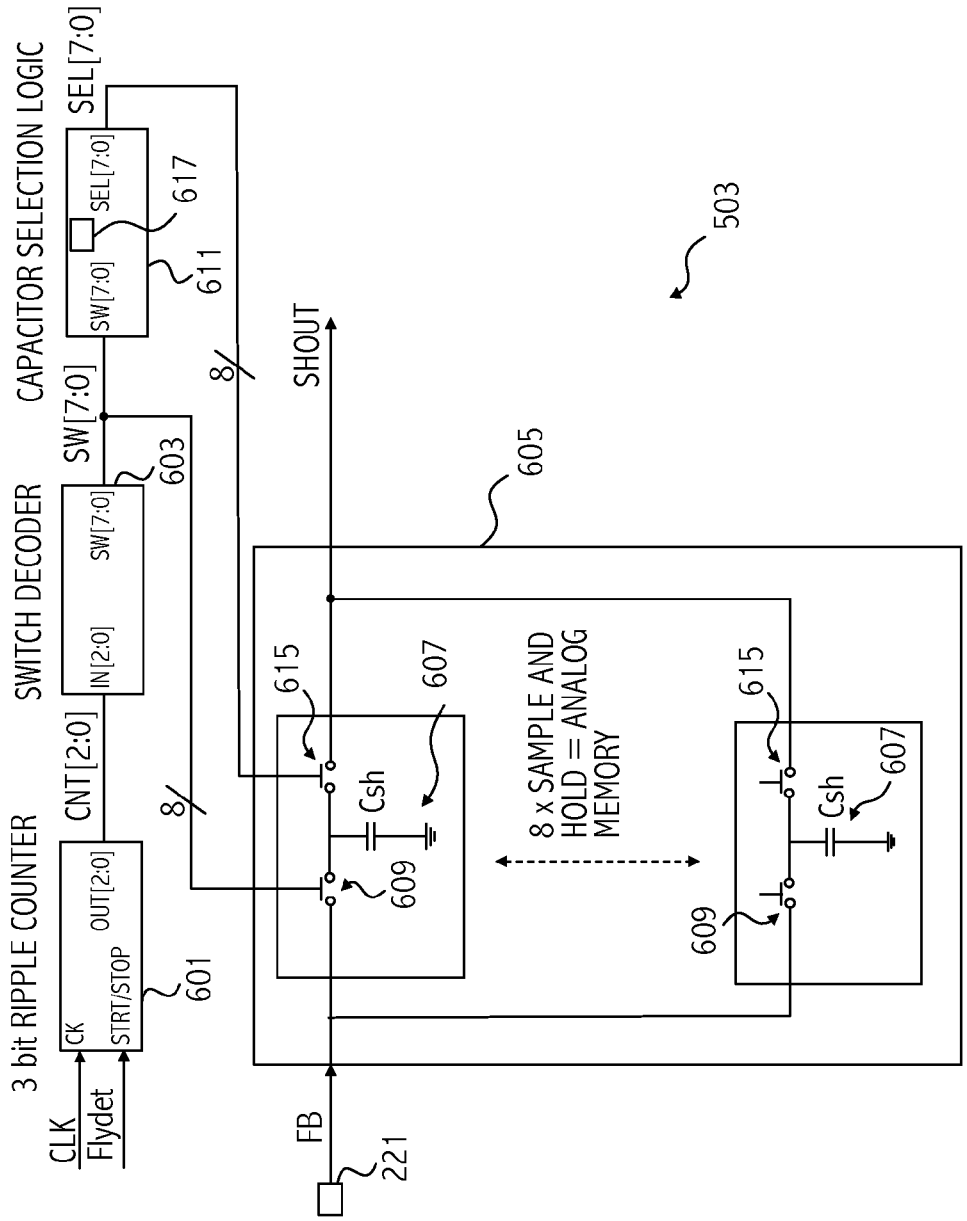
FIG. 6A illustrates additional detail of the analog memory block shown in FIG. 5.

FIG. 6A shows additional details of analog memory block 503 that includes control logic and analog storage. As part of the control logic, the analog memory block 503 includes a 3 bit ripple counter 601 that starts counting when flyback voltage is detected at the FB pin. As discussed more fully herein, when the flyback voltage is detected, the signal Flydet is asserted as shown at 307 in FIGS. 3 and 4. Assertion of the Flydet signal causes the ripple counter 601 to start counting. The output of the ripple counter bits CNT[2:0] drive switch decoder block 603. The switch decoder output SW[7:0] controls eight sample and hold capacitors 607 in analog storage 605. An exemplary truth table for switch decoder 603 is shown in FIG. 6B. The switch decoder output SW[7:0] provides control signals (gate signals) to switches 609 such that only one switch 609 is enabled at any one time and therefore only one sample and hold capacitor connects to FB pin 321 during any given sampling interval. The ripple counter 601 rolls over to zero after its maximum count value is reached. That way, the ripple counter causes a value stored at each sample and hold capacitor to be overwritten by a new value every 8 cycles. As a result of that, the analog storage makes available an eight sample long analog memory (or history) of the FB input at any given moment, once eight samples have been sampled and stored. The oscillator clock frequency can be selected to provide sufficient sampling resolution (e.g., on the order of several MHz). Note that the size of the analog storage at eight and use of a three bit ripple counter is exemplary and other analog storage sizes may be used, e.g., sixteen and corresponding control logic.

Referring back to FIG. 4, when the flyback voltage at FB pin 221 drops approximately 100 mV below FB reference voltage (100 mV is arbitrarily chosen for illustration and will depend on the particular implementation) the ripple counter 601 stops in response to the signal Flydet going low. At this point the last eight samples of the sampled FB voltage are available in analog memory block 503. The most recent few samples are not "good" because they were possibly taken when the flyback voltage was already starting to drop rapidly and therefore are not reliable. However, since the last eight samples are available in analog storage 605, "older and better" samples can be used. In an embodiment the bits SEL[7:0] are forced to 0 when Flydet=1 to avoid SHOUT being shorted to the FB node if switches 609 and 615 are both ON at the same time.

In an exemplary embodiment, obtaining reliable samples is accomplished using capacitor selection logic block 611. In order to select the particular sample and hold capacitor holding the desired history FB sample capacitor selection logic 611, capacitor selection logic 611 supplies signals SEL[7:0], which provide control signals to switches 615 to select one of the storage capacitors 607. Capacitor selection logic may include a programmable storage location 617 specifying how far back in history from the current last sample should be selected. The selection logic may be implemented to count from the current last location supplied by SW[7:0] to the desired history value.

FIG. 6C illustrates an exemplary capacitor selection logic truth table showing an example of going back six samples in time. Thus, for example, if the current value of SW[7:0] is '00000001', going back six samples causes the SEL[7:0] signals to be '00000100'. The particular history sample chosen, e.g., sixth or fifth, etc., can be programmable at an IC level if desired, e.g., through register 617, either at manufacturing or in a system through a serial interface (not shown). The use of eight samples and correspondingly sized control logic is exemplary and it is understood that in practice the capacity of the analog memory block can be greater. There is a limitation as to how small a history may be maintained in order to still ensure valid flyback voltage samples are available. However, in some embodiments, a history of, e.g., as few as four samples may suffice depending on such factors as the sampling frequency. The analog memory block enables storing the flyback voltage on the FB input during a sweet spot in time when the current through the output diode is close to zero (which as explained above is the best sampling moment), but not too late because once the diode current is zero, the flyback voltage drops very quickly.

Referring again to FIG. 5, the selected stored sample and hold out value (SHOUT), which represents an accurate measurement of the flyback voltage, is supplied to Gm transconductance amplifier 509, which supplies a feedback error signal. The amplifier 509 compares the flyback voltage (sample and hold out value (SHOUT)) to an expected value Vref. The amplifier 509 provides an appropriately amplified error signal to comparator 511, which compares the error signal and the voltage corresponding to the primary winding current through sense resistor 220 (see FIG. 2) supplied on current sense (CS) terminal 513 to control the gate drive signal.

FIG. 5 depicts a PWM controller using current mode control in which the primary inductor current is directly controlled by a feedback error signal using comparator 511. Note that the flyback voltage approach described herein is also applicable to voltage mode control in which an oscillator sawtooth ramp and the stored flyback voltage sample, which is compared to the ramp, are used to create a PWM signal.

Figures 7A, 7B:
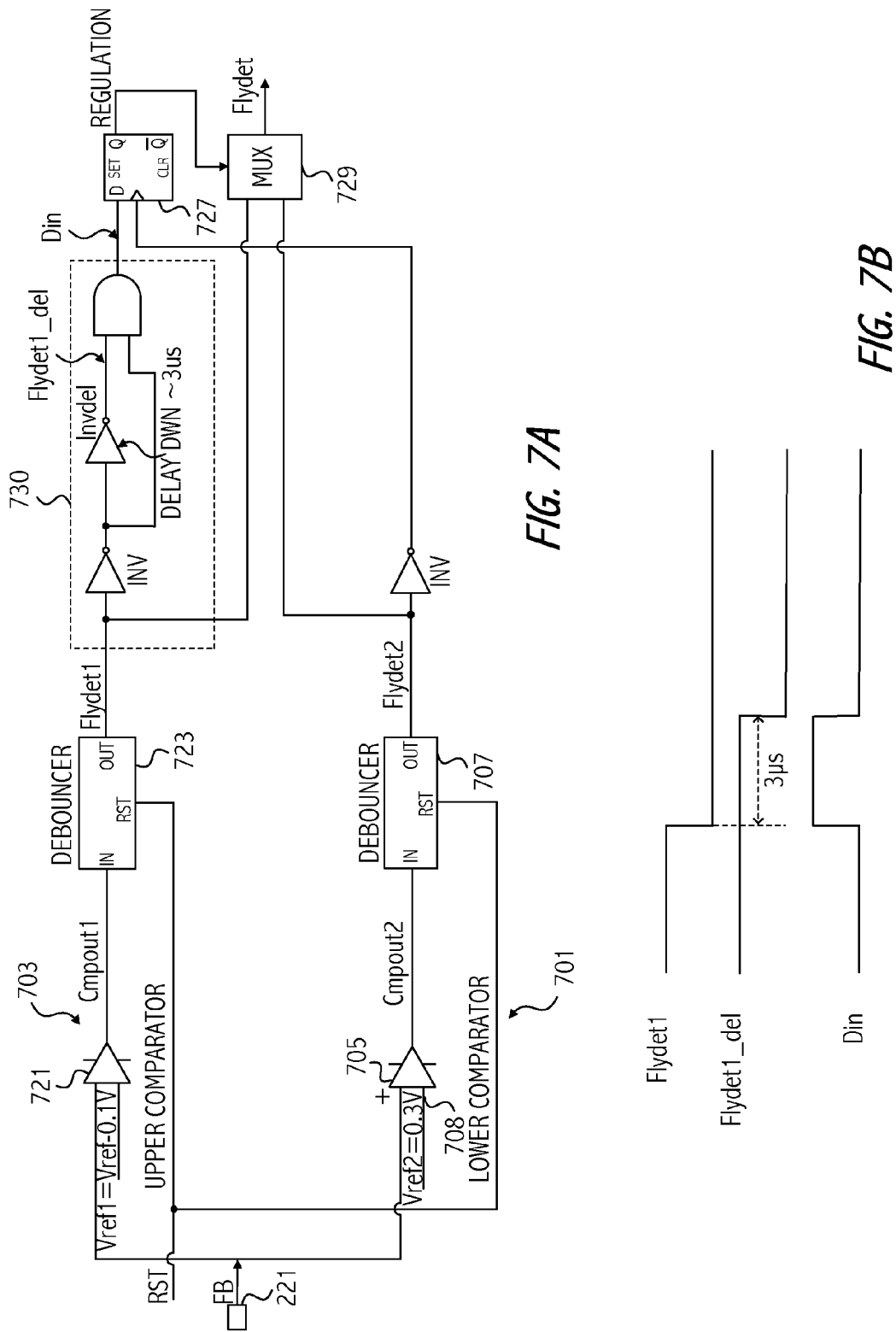
FIG. 7A illustrates an exemplary flyback detection circuit.
FIG. 7B is a timing diagram illustrating the operation of a portion of the detection circuit of FIG. 7A.

FIG. 7A shows a block diagram of an exemplary flyback detection circuit 501. It has two flyback detection signal paths 701 and 703 coupled to the FB pin 321. The lower path includes lower comparator 705 and debouncer 707 and detects the presence of flyback voltage all the time, because the lower comparator 705 has a reference 708 close to ground, e.g., at 0.3V. The lower path 701 provides flyback pulse detection during startup, overload conditions, etc., when the output voltage of the AC/DC converter is not close to the target value. That can also be important for providing information about various fault conditions.

Once the output voltage is closer to the target value, the upper comparator path 703 is active and provides a more accurate sampling of the flyback waveform, because the end of flyback is detected when the flyback voltage drops just about 100 mV below the target. The upper comparator path 701 includes the upper comparator 721 and a debouncer circuit 723. The upper comparator 721 uses a reference voltage close to the expected flyback voltage, e.g., 100 mV less than the expected flyback voltage. Thus, Vref1=Vref−0.1V, where Vref is the expected value of the flyback voltage sampled at the FB pin as in FIG. 5.

A signal called Regulation supplied from flip-flop 727 indicates that the output voltage is close to the target, which means that Flydet signal from the upper path is selected in multiplexer 729 for more accurate regulation. Being close to target is determined from the proximity in time between Flydet1 and the Flydet2 signals. With reference to FIG. 4, when the output voltage is close to its target, the flyback voltage should fall off very rapidly between Vref1 and Vref2. If the falling edge of Flydet2 occurs within the delay period (3 μseconds in the illustrated embodiment), that causes flip-flop 727 to clock in a high value and the Regulation signal selects the upper path (Flydet1). In other words, Regulation=1 if the Flydet2 falling edge is within 3 μs of Flydet1 falling edge and Regulation=0 if Flydet2 falling edge comes more than 3 μs s after the Flydet1 falling edge. FIG. 7B illustrates the operation of the circuit portion 730.

Referring again to FIG. 4, if the output voltage is below the target (Regulation=0) then the whole Va waveform shown would be shifted down. Thus, whether the output voltage is close to or not close to its target value is reflected in the flyback voltage. If the Va waveform shifts down then Flydet1 falling edge 403 moves significantly to the left in time, but Flydet2 falling edge (0.3V threshold) moves to the left in time only little bit. That results in the Flydet2 falling edge being more than 3 μs delayed after Flydet1 falling edge and Regulation=0. By selecting Flydet2=Flydet when Regulation=0 helps ensure flyback voltage is detected and the output voltage is known (although not as accurately as in Regulation=1 because we do not sample in as optimum a moment as in Regulation=1). Also in the extreme case (when output voltage is close to 0V, for example during start-up or during output over-load or output short), the Flydet1 waveform will be stuck at 0 and only Flydet2 will be toggling which also results in Regulation=0.

Figure 8A:
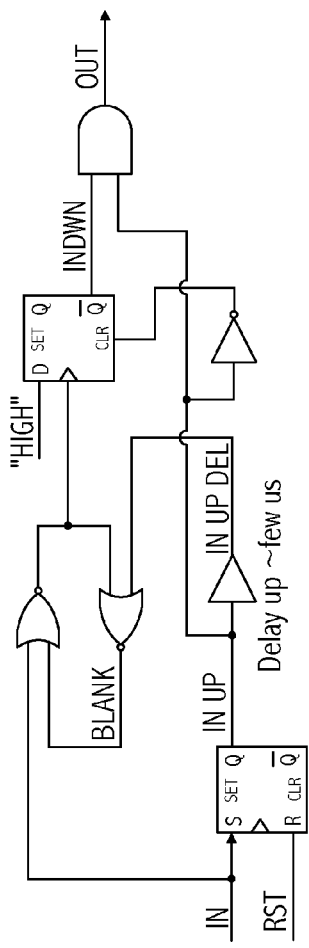
FIG. 8A illustrates an exemplary debounce circuit.
Figure 8B:
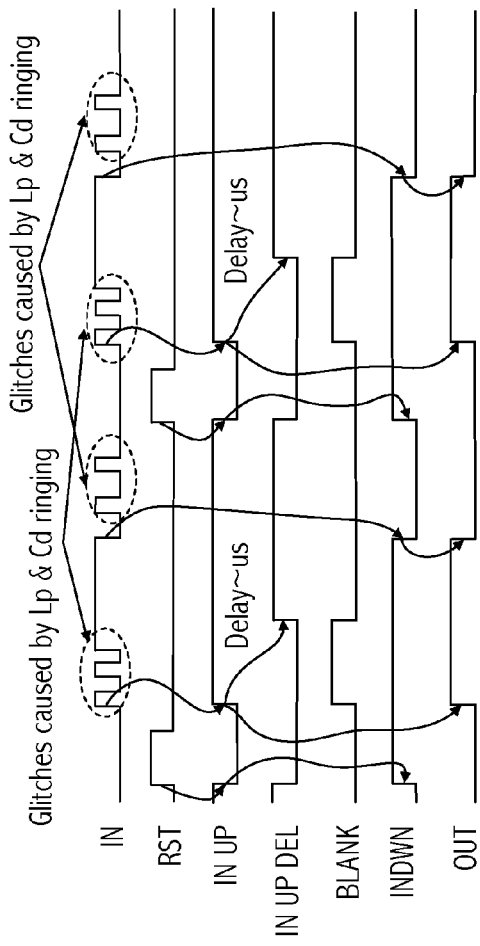
FIG. 8B illustrates a timing diagram associated with the debounce circuit of FIG. 8A.

FIGS. 8a and 8b illustrate an exemplary debouncer circuit implementation and an associated timing diagram for the debouncer circuits 703 and 723 in FIG. 7. A debouncer circuit helps to ignore any ringing due to the Llkp and Cd resonant circuit and also ringing due to the Lp and Cd resonant circuit (see FIGS. 2 and 3). Ringing due to Llkp and Cd is present at the beginning of the flyback pulse and is rejected by blanking a few microseconds after the flyback waveform rising edge. The ringing due to Lp and Cd (see FIG. 3) is rejected by accepting only the first falling edge of flyback waveform after the blanking interval has expired in each cycle.

The description of the invention set forth herein is illustrative, and is not intended to limit the scope of the invention as set forth in the following claims. Variations and modifications of the embodiments disclosed herein may be made based on the description set forth herein, without departing from the scope and spirit of the invention as set forth in the following claims.

What is claimed is:

1. A method for use in a switching voltage converter, comprising:
    sampling and storing flyback voltage samples corresponding to a flyback voltage on a primary side of the switching voltage converter, the samples being stored in respective storage locations and providing a history of the flyback voltage; and
    stopping the storing of additional samples in response to detecting the flyback voltage falling below a threshold voltage value.

2. The method as recited in claim 1 further comprising:
    selecting one of the stored flyback voltage samples, older than a most recent sample, as indicative of an output voltage on a secondary side of the switching voltage converter.

3. The apparatus as recited in claim 2 further comprising using the selected one of the stored samples values to control generation of the output voltage by controlling a transistor on the primary side.

4. The method as recited in claim 1 further comprising:
    detecting the flyback voltage in two paths in a flyback detector;
    using a first of the two paths to generate a flyback detect signal indicating the flyback voltage is present when an output voltage is close to a target value; and
    using a second of the two paths to generate the flyback detect signal when the output voltage is not close to the target value.

5. The method as recited in claim 1 wherein the sampling and storing comprises charging a capacitor to correspond to a value of the flyback voltage.

6. The method as recited in claim 1 further comprising starting a ripple counter on detection of the flyback voltage and selecting a respective one of the plurality of storage locations to store the sample corresponding to the flyback voltage according to a count value of the ripple counter.

7. The method as recited in claim 6 further comprising overwriting each storage location according to a sampling frequency and how many storage locations are provided.

8. The method as recited in claim 2 wherein the selecting of the one of the stored values further comprises:
    enabling one of a plurality of switches coupled to respective ones of the storage locations according to a select value stored in a programmable location.

9. The method as recited in claim 1 wherein the flyback voltage is voltage on an auxiliary winding.

10. An apparatus comprising:
    a detection circuit to generate a first indication indicating that a flyback voltage is above a first predetermined voltage and to generate a second indication of the flyback voltage going below a second predetermined voltage; and
    a storage to store respective samples corresponding to the flyback voltage, the storage being enabled to store the respective samples in respective storage locations responsive to the first indication and to stop storing additional samples corresponding to the flyback voltage responsive to the second indication.

11. The apparatus as recited in claim 10 wherein the first and second indications are respectively, assertion and deassertion of a flyback detect signal supplied by the detection circuit.

12. The apparatus as recited in claim 10 further comprising:
    a selector circuit to select the respective storage locations into which respective samples are stored.

13. The apparatus as recited in claim 12 wherein the selector circuit comprises a counter responsive to the first indication to begin counting and responsive to the second indication to stop counting.

14. The apparatus as recited in claim 13 wherein the storage includes:
    a capacitor for each storage location;
    first switches coupled to the input node and respective ones of the capacitors, respective ones of the first switches enabled according to the count value of the counter; and
    second switches coupled to respective capacitors and configured to supply a value from a selected storage location to an output node of the storage according to respective select signals supplied to the second switches.

15. The apparatus as recited in claim 10 wherein the apparatus is configured to overwrite locations in the storage to maintain an N bit history of N most recent samples, where N is an integer greater than or equal to four.

16. The apparatus as recited in claim 10 further comprising a storage select circuit to select one of the stored samples corresponding to the flyback voltage, the selected one of the stored samples being older than a most recent sample stored, the selected one of the stored samples being indicative of an output voltage on a secondary side of a switching voltage converter for use in controlling a transistor on a primary side of the switching voltage converter to control generation of the output voltage.

17. The apparatus as recited in claim 16 further comprising an amplifier circuit to compare the one of the stored samples to an expected value to generate an error value for use in controlling the output voltage.

18. The apparatus as recited in claim 10 wherein the detect circuit further comprises:
    a first and second detect path to generate a first and second flyback detect signal, the first and second path including a first and second comparator, respectively, wherein the first path is used when an output voltage at a secondary side of a switching voltage converter is near a target value and the second path is used when the output voltage is not near the target value.

19. The apparatus as recited in claim 18 wherein the nearness to the target value is determined according to a proximity in time of a falling edge of a first flyback voltage detect signal having a falling edge determined by a first voltage level and a second flyback voltage detect signal having a falling edge determined by a second voltage level.

20. The apparatus as recited in claim 10 further comprising an auxiliary winding in a primary side of a switching voltage regulator and wherein the flyback voltage is from the auxiliary winding.

* * * * *